Patented Aug. 1, 1939

2,168,253

UNITED STATES PATENT OFFICE 2,168,253

PROCESS OF DRESSING TEXTILES

Gerhard Balle and Georg Schulz, Frankfort-on-the-Main, Germany, assignors to I. G. Farbenindustrie Aktiengesellschaft, Frankfort-on-the-Main, Germany No Drawing. Application October 6, 1936, Serial No. 104,335. In Germany October 10, 1935

3 Claims. (Cl. 91—68)

The present invention relates to a process of dressing textiles.

We have found that for dressing textiles bodies may advantageously be used which contain in the molecule a nitrogen atom bound in a quaternary manner and at least one carboxyl-group linked to the said nitrogen atom by a carbon bridge or a functional derivative of such a carboxyl-group, for instance a carboxylic acid ester group or a carboxylic acid amide group, and at least one aliphatic radical with more than 6 carbon atoms. These compounds have the property, even in low concentrations, to impart to the textiles treated therewith a good pliability and smoothness.

The following bodies are examples of bodies which may be used in this invention:

Condensation products of tertiary aliphatic amines of high molecular weight containing an aliphatic radical of at least 6 carbon atoms in the molecule, with halogen fatty acid esters as, for instance, stearylmethylamino-acetic acid methyl ester-metho-chloride (stearyldimethyl-betaine methylester chloride)

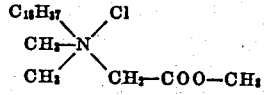

oleyldiethanolbetaine-ethyl ester chloride

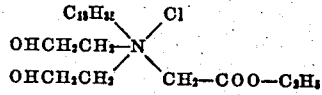

The ester group of these two compounds may either be saponified, for instance by means of caustic soda solution, into the sodium salt of the corresponding betaine chloride carboxylic acid or transformed into the acid amide by treatment with ammonia or a primary or secondary amine, for instance:

Stearyl-dimethylbetaine-dodecylamide chloride

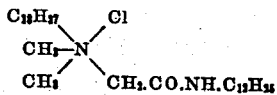

Palmityldimethylbetaine-dimethylamide chloride

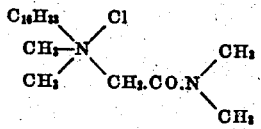

There may be used, furthermore, the condensation products of tertiary amines of low molecular weight with halogen fatty acid esters which have subsequently been amidated with a primary or secondary amine of high molecular weight, for instance, trimethylbetaine-oleylamide chloride

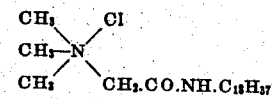

Tetramethylethylenedibetaine-stearylamide dichloride

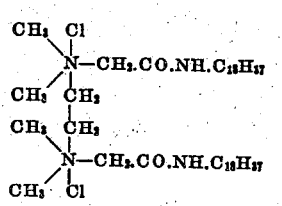

furthermore, products obtainable from tertiary amines, substituted in the alkyl radical, by reaction with halogen fatty acid esters and subsequent amidation, for instance acetododecylamide-dimethylbetaine-dodecylamide chloride

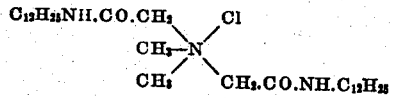

Products suitable for the present purpose may also be obtained by per-alkylating the reaction products of the reaction of primary amines of high molecular weight with the sodium salt of a halogen fatty acid, for instance

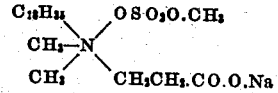

-sodium oleylaminopropionate per-methylated with dimethylsulfate; or by causing to react tertiary amines on alpha-halogenated fatty acids of higher molecular weight or alkali salts or esters thereof, for instance

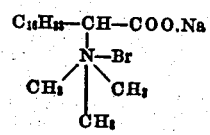

sodium alpha-bromo-stearate treated with trimethylamine.

The compounds may not only be used alone but also in admixture with other dressing agents such as condensation products of fatty acid, fatty alcohol sulfonates, sulfonated oils, starch, dextrine, paraffin and delustring agents such as, for instance, titanium dioxide.

The following examples serve to illustrate the invention, but they are not intended to limit it thereto; the parts are by weight:

1. A viscose artificial silk skein is treated for 15 minutes with a solution of 0.3 gram per liter of dimethylamino-acetic acid stearylamide methochloride (trimethylbetaine-stearylamide chloride) (obtainable, for instance, from trimethylamine and monochloracetic acid methyl ester and amidation with stearylamine), hydroextracted and dried. The material obtained is more pliable and has a smoother feel than the non-treated material has.

2. A viscose artificial silk fabric is treated for 15 minutes on the winch dye beck in a bath containing 0.5 g. per liter of stearyldimethylbetaine-dodecylamide chloride at ordinary temperature, then hydroextracted and dried. The material obtained has a beautiful, soft and full feel which is even very stable to intense rinsing.

3. An artificial cuprammonium silk skein is treated for a short time at 40° C. in a bath containing 0.2 gram per liter of trimethylbetaine-oleylamide chloride, hydroextracted and dried. The material thus treated has an essentially better feel than the material which has not been treated with the said bath.

4. A mixed fabric of cotton and artificial cuprammonium silk is treated on the foulard in a bath containing 3 g. of stearylmethylaminoacetic acid methylestermethochloride (stearyldimethylbetaine-methylester chloride) and dried. The material obtained has a full and soft feel.

We claim:

1. A process of dressing textiles by impregnating them with the compound stearyldimethyl-betaine-dodecylamide chloride of the formula:

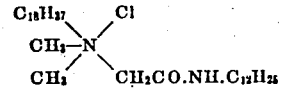

2. A process of dressing textiles by impregnating them with the compound trimethylbetaine-oleylamide chloride of the formula:

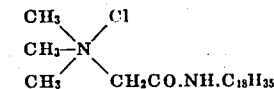

3. A process of dressing textiles which comprises impregnating the textiles with a compound of the formula

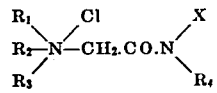

where $R_1$, $R_2$, $R_3$ and $R_4$ are alkyl radicals, at least one R being an aliphatic hydrocarbon radical having more than 6 carbon atoms, and X represents H or a methyl group.

GERHARD BALLE.
GEORG SCHULZ.